United States Patent [19]
Beeuwkes, III

[11] Patent Number: 5,393,184
[45] Date of Patent: Feb. 28, 1995

[54] SELF RETAINED STAPLED CONSTRUCTION

[76] Inventor: Reinier Beeuwkes, III, 1360 Monument St., Concord, Mass. 01742

[21] Appl. No.: 123,678

[22] Filed: Sep. 20, 1993

[51] Int. Cl.$^6$ .............. F16B 15/00; F16B 15/02
[52] U.S. Cl. .................. 411/469; 411/480; 411/920; 174/159
[58] Field of Search .......... 411/457, 469, 480, 920; 174/159, 160, 164, 165, 166 R

[56] References Cited

U.S. PATENT DOCUMENTS

| | | | |
|---|---|---|---|
| 1,099,320 | 6/1914 | Southgate | 174/159 |
| 2,323,362 | 6/1943 | Weiss | 174/159 |
| 2,526,902 | 10/1950 | Rublee | 174/159 |
| 2,901,200 | 8/1959 | Voeks | 174/159 |
| 3,176,945 | 4/1965 | Anderson | 411/469 X |
| 4,114,859 | 9/1978 | Stenson | 411/920 X |
| 4,582,288 | 4/1986 | Ruehl | 411/469 X |

Primary Examiner—Neill R. Wilson
Attorney, Agent, or Firm—James L. Jackson

[57] ABSTRACT

A self-retaining staple construction is provided having a retainer bridge from which extend a pair of spaced, sharp pointed staple legs which are capable of penetrating a structure. The staple is provided with opposed inwardly directed retainer projections which permit assembly of the staple construction to an object and which retain the staple in assembly with the object. These retainer projections may be defined by resilient or rigid retainer members and may include an adhesive composition for securing the staple to an object.

17 Claims, 2 Drawing Sheets

SELF RETAINED STAPLED CONSTRUCTION

FIELD OF THE INVENTION

This invention relates generally to staples for securing objects such as electrical cable to structures such as the wood structures of buildings under construction. More particularly, the present invention concerns a staple construction having the capability for retention of the staple in assembly with the object being secured to the structure thus permitting both the object and the staple to be simultaneously oriented with respect to the structure prior to retaining penetration of the staple into the structure.

BACKGROUND OF THE INVENTION

U-shaped staples have been used for many years for the connection of objects, particularly elongate objects such as fence wire, electrical wire or multi-wire electrical cable to various structures that can be penetrated by the penetrating legs of the staple. The manner by which most staples of this nature are used is for the user to place the staple about the object and, while holding the staple, shift the staple and the object to a desired position with respect to the structure. The user, while holding the staple in this manner, utilizes a hammer or other suitable instrument for driving the staple so as to cause its legs to penetrate securely into the structure to thereby secure the wire or other object in assembly with the structure. It is also well known that in many cases, especially in confined spaces, it is difficult to simultaneously orient the object and staple and hold the staple while hitting it with a hammer. Frequently the staple is hit improperly by the hammer and is bent and consequently must be straightened or discarded. Since the user's fingers are typically near the bridge of the staple which is struck by the hammer the user's fingers can be struck by the hammer or pinched by the staple. This disadvantage is well known to virtually all users of staples. It is desirable therefore to provide a staple construction which can be simultaneously oriented with respect to a structure along with an object to be secured by the staple so that the fingers of the user can remain clear of the staple construction and therefore cannot be injured in the manner described above..

It is also well known to the users of staples, especially where accurate staple positioning of an object is desired that typically the presence of the user's fingers to hold the staple until it is partially driven into the structure causes visual interference with accurate positioning of the staple and perhaps also the object to be secured by. It is desirable therefore to provide a staple construction that can be accurately positioned with respect to the structure into which it is to be driven prior to initial striking of it with an implement such as a hammer. It is also desirable to provide for simultaneous positioning of the object to be secured and the staple for securing the object with respect to a structure to which the object is to be secured by the staple and to do so in such a manner as to avoid any necessity for the user to place the hand or fingers in the near vicinity of the staple.

SUMMARY OF THE INVENTION

It is a principal feature of the present invention to provide a novel self-retaining staple construction which, when assembled to an object to be retained, establishes an interrelated structural relationship with the object so that it is releasably retained in assembly with the object.

It is another feature of this invention to provide a novel self-retained staple construction which is capable of releasable assembly to an object to be retained and which is capable of orientation by the object in such a manner that the staple is easily orientable for accurate positioning in relation to a structure so that the staple can be driven into the structure by means of a hammer or other suitable stapling implement.

It is another feature of the present invention to provide a novel self-retaining staple construction which, after assembly with the object to be secured thereby, is readily movable linearly relative to the object so that the staple can be very accurately oriented with respect to the structure into which it is to be driven.

There is an even further feature of the present invention to provide a novel self-retaining staple construction which is particularly adapted for securing elongate objects such as multi-wire electrical cable typically referred to as romex cable, and which establishes an oriented structural interrelation with the elongate object so that it is oriented by the object and is thus easily positionable in relation to the structure into which it is to be driven without necessitating manual positioning of the staple by means of the hands or fingers of the user.

It is an even further feature of this invention to provide a novel self-retaining staple construction which incorporates a yieldable retainer element which is disposed in assembly with a rigid, preferably metal, U-shaped staple, and functions to retain the staple in assembly with the object prior to driving of the staple into the structure to which the object is to be secured and which at least partially captivates the object when the staple is driven to its object retaining depth into the structure.

Briefly the various objects and features of the present invention are realized through the provision of a self-retaining staple construction having a U-shaped, generally rigid staple having a transverse connecting bridge from which spaced staple legs extend. The staple legs are each provided with sharp end points thus enabling the staple legs to be driven into a structural element such as a wood structure when the connecting bridge portion of the staple is struck by a suitable implement such as a hammer. For retention of the staple in assembly with the object to be retained thereby prior to driving of the staple into the structure, the staple is provided with any one of a number of suitable forms of retainer structures, thereby allowing the staple to be assembled to as well as oriented by the object to be retained by the staple.

In one suitable embodiment a retainer element composed of polymer or any other suitable yieldable material is disposed in assembly with the legs or the connecting bridge of the rigid staple. This yieldable retainer is of a construction which provides opposed spaced inwardly facing projections, being spaced a distance less than the width of the object to which the staple is to be assembled. As the staple is assembled to the object, these opposed spaced projections yield so as to permit the staple to be fully seated with respect to the object. When the staple is fully seated, the opposed yieldable retainer elements, being clear of the object, will return to the normal positions thereof and will function as retainers to prevent the staple from being inadvertently separated from the object. When so retained in this manner, the staple is orientable with respect to a structure to be penetrated by the staple by simply positioning the object in proper relation with respect to the structure to which it is to be retained by the staple. When so positioned, the user, with any suitable staple driving implement such as a hammer, will be able to easily and efficiently drive the staple so as to cause the staple legs to penetrate the structure and secure the object to the structure. The yieldable retainer projections may be defined by opposed spaced retainer fingers formed integrally with the retainer structure or, in the alternative, may be defined by a polymer strip which is folded to an accordion-like structural configuration. The opposed retainers or retainer fingers are sufficiently spaced from the transverse connecting bridge portion of the staple so as to define an object receptacle between the transverse bridge of the staple and the retainer fingers. Thus the staple construction is capable of being "snapped onto" the object and retained in assembly with the object by means of the resilient retainer fingers.

When the staple construction is driven into a structure for securing the object in place on the structure, the resilient retainer is capable of being yielded by the structure and to assume a condition or configuration where it at least partially captivates or encapsulates the object and thus provides for secure, immovable assembly of the object with respect to the structure penetrated by the staple while maintaining the object out of contact with the metal portion of the staple assembly.

In another form of the invention the staple may comprise a rigid U-shaped staple construction having an adhesive composition coating its transverse connecting bridge and perhaps a portion of a the leg structures of the staple so that the adhesive composition provides for temporary retention of the staple in assembly with the object until such time as the staple is properly oriented with and driven into the structure to which the object is to be secured. As a further alternative, a resilient retainer element may be disposed in assembly with a U-shaped rigid staple construction and may be at least partially coated with an adhesive to provide for retention of the staple construction in assembly with the object. In both of these cases the staple is placed in retained assembly with the object and is then oriented with respect to the structure by orienting the object relative to the structure. When so positioned the staple is then driven into the structure by means of a suitable implement.

In another form of the invention, where the object to be retained is of yieldable nature, such as is typically the case with electrical wire, the staple may be of generally U-shaped configuration and rigid construction. The opposed legs of the staple may be deformed so as to establish opposed inwardly directed spaced projecting portions having a spacing that is less than the width of the object to which it is to be assembled. These opposed spaced projections are located intermediate the length of the staple legs and thereby define a receptacle within which the object is located when the staple is in properly assembled relation with the object. During assembly of the staple, the object is slightly deformed by the opposed spaced retainer projections. When in assembly with the object this rigid staple can be accurately oriented with respect to the structure and then driven into retained assembly with the structure without necessitating manual holding of the staple by the hands or fingers of the user.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments which become obvious upon an understanding of this invention.

In The Drawings

FIG. 1 is an elevational view of a self-retaining staple construction that incorporates the features of the present invention and represents a preferred embodiment of the invention;

FIG. 2 is an elevational view similar to FIG. 1 illustrating a multi-wire electrical cable with the staple construction of FIG. 1 in retained assembly therewith;

FIG. 3 is an elevational view similar to that of FIGS. 1 and 2, illustrating the staple construction of FIGS. 1 and 2 with the staple in fully penetrated relation with a structure so as to secure the electrical cable to the structure;

FIG. 4 is an elevational view of an alternative embodiment of the present invention;

FIG. 5 is an elevational view similar to that of FIG. 4 and by way of cross-section illustrating a multi-wire electrical cable to which the staple construction is assembled;

FIG. 6 is an elevational view of the staple construction similar to that of FIGS. 4 and 5 and by way of cross-section showing the staple construction in retained assembly with a structure for securing the electrical cable to the structure;

FIG. 7 is an elevational view of an alternative embodiment of the present invention;

FIG. 8 is a view similar to that of FIG. 7 and showing the staple construction being in retained assembly with a multi-wire electrical cable;

FIG. 9 is a partial elevation, partial sectional view illustrating the staple construction of FIGS. 7 and 8 being driven fully into a structure and thus securing the electrical cable in assembly with the structure;

FIG. 10 is an elevational view illustrating a further alternative embodiment of this invention employing an adhesive for retention of the staple in assembly with the object;

FIG. 11 is an elevational view representing a further alternative embodiment of this invention employing an adhesive for retention of the staple in assembly with the object; and FIG. 12 is an elevational view of a staple construction representing a further alternative embodiment of this invention which is adapted for self-retained assembly with a yieldable object.

DETAILED DESCRIPTION OF PREFERRED EMBODIMENT

Figure 1:
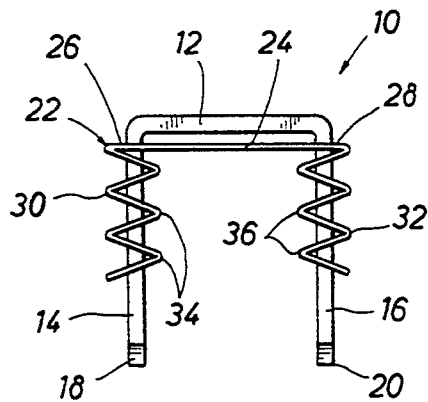

Referring now to the drawings and first to FIG. 1, a preferred embodiment of the present invention is illustrated which incorporates a generally U-shaped staple structure shown generally at 10 having a transverse connecting bridge 12 from which a pair of spaced staple legs 14 and 16 extend. The staple legs 14 and 16 are typically integrally connected to the transverse bridge section 12 thereof. The staple legs 14 and 16 define sharp pointed ends 18 and 20 respectively which enable the staple legs to be driven into penetrating relation with a structure such as the wood structure of a building under construction.

Figure 2:
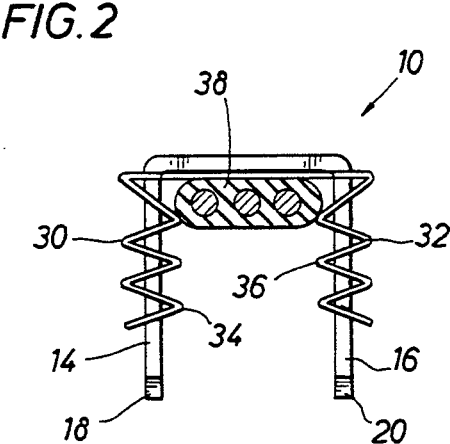
Figure 3:
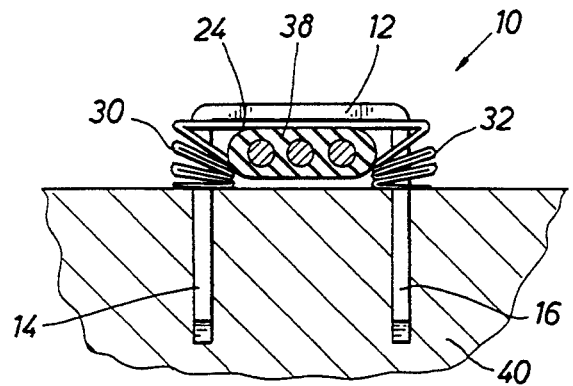

It is desirable to retain the staple construction in assembly with an object so that prior to driving the staple into the structure it is not necessary for the user to manually hold and orient the staple. In one form of the present invention this feature is accomplished by providing a staple retainer shown generally at 22 which may be composed of any one of a number of suitable yieldable materials such as any of a number of polymers or any of a number of rubber-like materials which may be non-electrically conductive. The staple retainer element 22 is generally of strip-like form having a transverse intermediate section 24 which is normally disposed in substantially parallel relation with the transverse bridge section 12 of the staple construction. The transverse intermediate section 24 of the retainer element 22 is penetrated by the staple legs 14 and 16 near the respective outer extremities 26 and 28 thereof. From the respective ends 26 and 28 of the transverse intermediate section 24, there extends accordion-like folded sections 30 and 32 of the retainer element which are preferably integral with the retainer element but may be connected in any suitable manner therewith. These accordion-like folded sections are penetrated in multiple locations by the respective legs 14 and 16 of the staple thus causing the folded sections to be securely positioned by the staple legs. Since the retainer element 22 and its accordion-like folding leg sections 30 and 32 are composed of a yieldable material the folded leg sections will readily yield as the staple is assembled to an object such as an electrical cable and will also yield as the staple is driven into a structure. The inner portions of the accordion-like folded sections 30 and 32 define a plurality of inwardly directed, spaced retainer projections 34 and 36 which are generally in the form of ridges, spaced by valleys. These ridges will readily yield as the staple is assembled to an electrical cable or other object thus permitting the staple to assume a retained position with respect to the object such as shown in FIG. 2. In this Figure a multi-wire electrical cable 38 of generally flat cross-sectional configuration is shown with the self-retained staple construction 10 in retained assembly therewith. The staple construction 10 is shown prior to its penetrating assembly to an object. In FIG. 3 the staple construction 10 is shown with its spaced penetrating legs 14 and 16 in penetrating assembly with an object 40 such as the wood structure of a building under construction. As the staple construction is assembled to the electrical cable 38 the inwardly directed retainer elements or ridges 34 and 36 will yield to permit movement of the retainers past the electrical cable. As soon as the retainers are past the cable they will recover from their bent or deflected positions to the original positions such as shown in FIG. 1 and the lower part of FIG. 3. In their original positions the retainers 34 and 36 will secure the staple construction to the electrical cable. As shown in FIG. 3 the staple legs have been driven into the structure 40 thereby causing the structure to yield or deform the retainer projections 34 and 36 so as to fit closely about the outer periphery of the electrical cable. In this manner the retainers function to captivate at least a portion of the cable structure and to insure the presence of a resilient material between the electrical cable and the rigid leg structure of the staple construction. Captivation or partial encapsulation of the electrical cable in this manner insures positive retention of the electrical cable in immovable relation to the staple structure. The rigid legs of the staple cannot bite into or otherwise damage the electrical cable structure because of the captivation that occurs as the resilient projections are deformed about the cable in the manner shown in FIG. 3.

Figure 4:
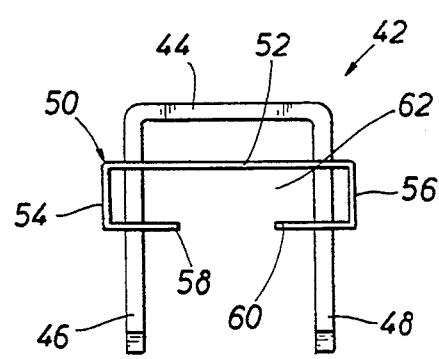
Figure 5:
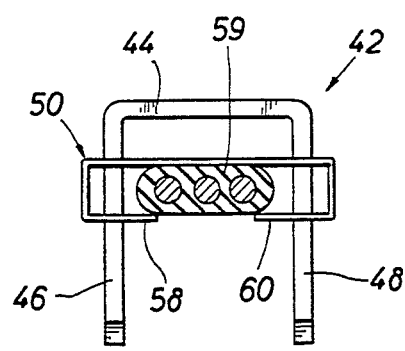
Figure 6:
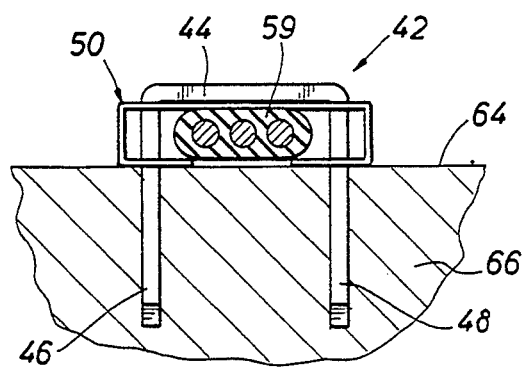

An alternative embodiment of the invention is shown in FIG. 4 wherein a staple construction shown generally at 42 having a generally U-shaped rigid staple structure defined by a transverse bridge section 44 an integral spaced, sharp pointed legs 46 and 48 extending therefrom. A retainer element, shown generally at 50, is in penetrated assembly with the rigid staple structure by virtue of being penetrated by the staple legs as shown in FIGS. 4–6. The retainer element 50 includes a transverse intermediate retainer section 52 having opposed reverse bent portions 54 and 56 integral therewith. These reverse bent portions define a pair of opposed retainer elements or fingers 58 and 60 which are disposed in opposed relation. These retainer fingers are sufficiently spaced from the transverse intermediate section 52 as to define a receptacle 62 within which an object such as an electrical cable is received as the staple construction is assembled thereto in the manner shown in FIG. 5. During such assembly, the resilient retainer elements 58 and 60 will be yielded by the electrical cable so as to position the electrical cable within the receptacle 62. As the cable moves fully within the receptacle it will have cleared the resilient fingers whereupon the resilient fingers will return to the original positions thereof as shown in FIG. 4. In these original positions, as shown in FIG. 5, the retainer elements 58 and 60 will function to retain the staple assembly in assembled relation with the electrical cable. Also, since the electrical cable is of substantially flat configuration the transverse intermediate section 52, also being flat, will orient the staple construction with respect to the electrical cable so that the spaced legs 46 and 48 will be oriented in substantially normal relation to the flat sides of the electrical cable. Thus, as a flat side of the electrical cable is brought into proper position with the flat surface 64 of a structure 66 the staple legs 46 and 48 will be oriented in normal relation with the flat surface 64 of the structure thereby permitting the staple legs to be readily driven into the structure as a hammer or other suitable implement is brought into forcible contact with the transverse bridge section 44 thereof.

Figure 7:
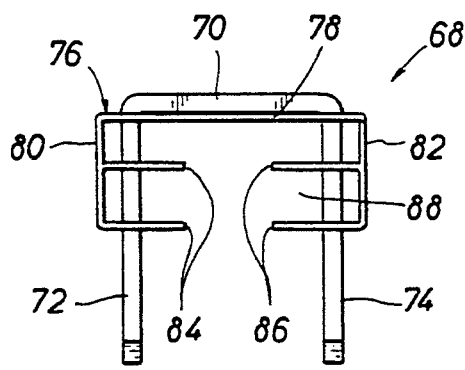
Figure 8:
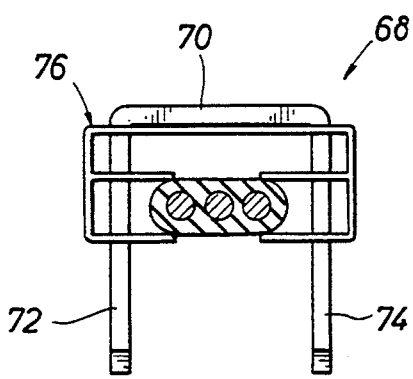
Figure 9:
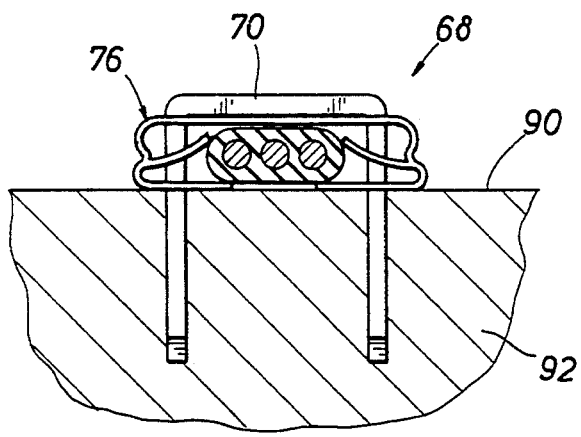

Another embodiment of this invention is shown in FIGS. 7–9 wherein a self-retained staple construction shown generally at 68 incorporates a rigid U-shaped staple structure having a transverse bridge section 70 from which spaced, sharp pointed legs 72 and 74 extend. A staple retainer element shown generally at 76, being composed of a resilient material includes a transverse intermediate section 78 which is penetrated at the outer extent thereof by means of the staple legs 72 and 74. The retainer element 76 defines opposed generally parallel sections 80 and 82 defining inwardly directed pairs of retainer elements or fingers 84 and 86. The upper pair of the retainer fingers corporate with the transverse intermediate section 78 so as to define a receptacle 88 within which an object such as the flat electrical cable of FIGS. 2, 3, 5 and 6 may be located. As the staple construction is assembled to the electrical cable the outer opposed resilient fingers 84 and 86 will yield thereby permitting positioning thereof within the receptacle 88. During such positioning the inner pair of resilient retainer fingers will yield somewhat. After the electrical cable has been positioned within the receptacle 88 as shown in FIG. 8 and the assembly force is relieved, the,, resilient retainer elements will return to the original positions thereof thereby capturing the electrical cable and retaining the staple construction in assembly with it. Also, the resilient retainer elements engage opposite flat sides of the electrical cable and thereby orient the staple construction so that the spaced penetrating legs 72 and 74 are oriented in substantially normal relation with the flat sides of the cable. Thus, as the electrical cable is oriented with its flat sides in substantially parallel relation with the flat surface 90 of a structure 92 the staple legs will be positioned in optimum relation with the structure for penetrating it when the staple is struck by an implement such as a hammer. As the staple is driven into the structure 92 the retainer element 76 will be deformed in the manner shown in FIG. 9 so as to be essentially deformed about the electrical cable and to captivate the cable in a manner discussed above. Thus, when the staple is in full penetration with the structure 92 the electrical cable will be captivated by the resilient retainer 76 so that the electrical cable is protected and may be insulated from the rigid, typically metal structure of the staple by means of the resilient retainer fingers and the transverse intermediate section of the retainer element. As is the case with the other embodiments of the invention shown in FIGS. 1–9 the resilient retainers of the retainer elements also function to center the electrical cable with respect to the staple construction. This feature prevents any portion of the staple structure from biting into the electrical cable as the staple is driven into the structure to which the electrical cable is to be attached.

Figure 10:
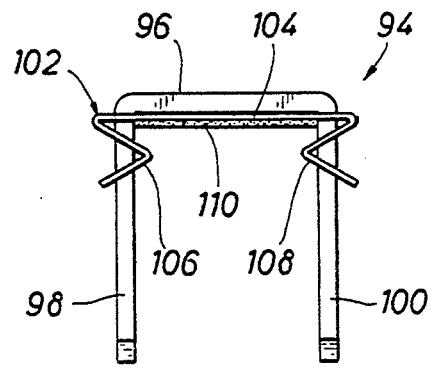

Another embodiment of the invention is shown generally at 94 in FIG. 10 which incorporates a generally rigid, U-shaped staple structure having a transverse bridge section 96 from which spaced, sharp pointed legs 98 and 100 extend. A retainer element, shown generally at 102, is provided having a transverse intermediate section 104 which is penetrated at its outer extent by the spaced penetrating legs 98 and 100. The retainer element 102 may be provided with opposed inwardly directed retainer projections such as shown at 106 and 108 which may be defined by accordion-like folded outer sections of the strip-like retainer 102. A layer of adhesive material 110 is provided on the inner surface portion of the transverse intermediate section 104 of the retainer element and is thus presented for contact by a flat side of the electrical cable or other object to which the staple construction is assembled. When assembled to the electrical cable the flat surface 110 defined by the adhesive by virtue of the flat transverse intermediate section 104 engages a flat surface of the electrical cable and thereby orients the spaced penetrating legs 98 and 100 of the staple construction in substantially normal relation with the flat sides of the cable. Thus, when the electrical cable is properly oriented with respect to a flat surface of a structure to which it is to be attached, the penetrating legs of the staple will be properly oriented for optimum penetration into the structure.

Figure 11:
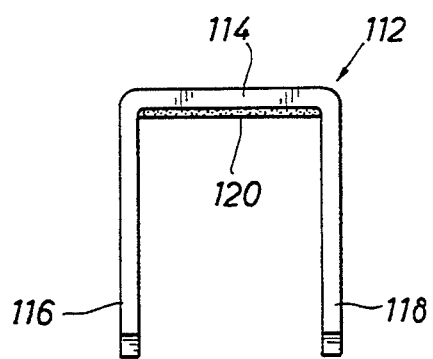

Another adhesive retained staple structure is shown generally at 112 in FIG. 11 and incorporates a staple structure having a transverse bridge section 114 from which spaced, sharp pointed staple legs 116 and 118 extend. The inner surface of the transverse bridge section 114 is coated with a layer of adhesive material 120 which is oriented for contact with a flat side of the electrical cable as the staple construction is assembled to the cable. The adhesive material 120 will retain the staple construction 112 in properly oriented relation with the electrical cable thus providing for optimum penetration of the legs 116 and 118 into a structure such as the wood structure of a building under construction. With the staple in assembly with the electrical cable in this manner, the electrical cable is positioned as desired with respect to a structure and the staple is then driven into the structure by means of a hammer or other suitable implement. It is not necessary for the user to place the hands or fingers in close proximity to the staple as it is driven into the structure.

Figure 12:
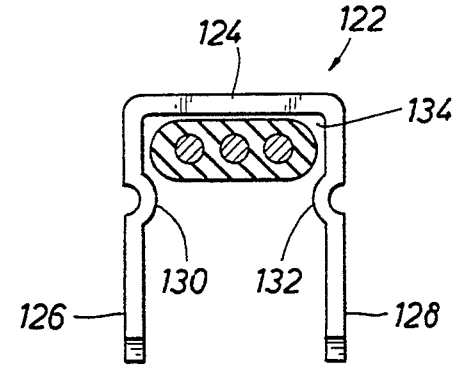

In the embodiment shown generally at 122 in FIG. 12 a staple construction is shown having a transverse bridge section 124 having spaced, sharp pointed penetrating legs 126 and 128 extending therefrom. The extremities thereof the legs 126 and 128 are deformed inwardly so as to define inwardly projecting retainer elements 130 and 132. These retainer elements are rigid as compared to the flexible retainer elements of the embodiments shown in FIGS. 1–10. They are sufficiently spaced from the transverse bridge section 124 as to define a receptacle 134 which receives the electrical cable as the staple is positioned in assembly with it. The staple construction 122 is used when the electrical cable or other object being retained thereby is somewhat yieldable. The spacing of the retainer elements 130 and 132 is less than the width of the electrical cable so that retainer projections of the staple construction slightly deform the electrical cable as the staple snaps over the electrical cable and is then retained in assembly therewith. The retainer elements 130 and 132 displace the opposite ends of the electrical cable to thus allow assembly of the staple structure to the cable. The projections 130 and 132 may also function as stops to limit penetration of the staple legs into the structure to which the electrical cable is to be attached.

Since certain changes or modifications may be made in the disclosed embodiments without departing from the inventive concepts involved, it is the aim of the appended claims to cover all such changes and modifications falling within the true spirit and scope of the present invention.

What is claimed is:

1. A staple construction for securing an object to a structure, comprising:
   (a) a retainer bridge;
   (b) a pair of spaced staple legs projecting from respective ends of said retainer bridge, each of said spaced staple legs having a pointed extremity for retaining penetration of said structure; and
   (c) at least one staple retainer member for retaining said staple construction in assembly with said object prior to forcible retaining penetration of said spaced staple legs into said structure, said at least one staple retainer member being disposed in assembly with said spaced staple legs and having a plurality of ridges and valleys extending along at least a portion of the length of said spaced staple legs, said at least one staple retainer member having opposed yieldable retainer projections defining a space therebetween of less dimension than the dimension of said object and normally defining object retaining positions, said yieldable retainer projections being sufficiently spaced from said retainer bridge to permit movement of said yieldable retainer projections completely past said object upon assembly of said staple construction to said object and returning to said object retaining positions upon movement thereof past said object thus retaining said staple construction in assembly with said object.

2. The staple construction of claim 1, wherein said staple retainer member comprises:

at least one body of resilient material being in assembly with said staple construction and defining at least one transversely projecting yieldable object retainer element normally having an object retaining position, said yieldable object retainer element being yieldable from said object retaining position by said object to permit assembly of said staple construction to said object and returning to said object retaining position after assembly of said staple construction to said object to thus retain said staple construction in assembly with said object.

3. The staple construction of claim 2, wherein:
said staple retainer means is supported by said spaced staple legs.

4. The staple construction of claim 2, wherein:
said staple retainer means is supported by said object retainer element.

5. The staple construction of claim 2, wherein:
said staple retainer means is composed of electrically insulative material.

6. The staple construction of claim 2, wherein:
upon penetration of said spaced staple legs into said structure said yieldable object retainer element being deformable between said structure and said object and captivating at least a portion of said object.

7. The staple construction of claim 1, wherein:
upon penetration of said spaced staple legs into said structure said yieldable retainer being deformable between said structure and said object and captivating at least a portion of said object.

8. The staple construction of claim 1, wherein:
(a) said staple retainer member is composed of electrically insulative polymer strip material having an elongate substantially straight intermediate portion and accordion-like folded end portions defining said ridges and valleys; and
(b) said spaced penetrating legs of said staple construction penetrating and stabilizing respective accordion-like folded end portions; and
(c) said ridges and valleys being defined by said accordion-like folded end portions and being yieldable by said object as said staple construction is assembled about said object.

9. The staple construction of claim 1, wherein said means for retaining said staple construction in assembly with said object comprises:
a quantity of adhesive material being present on said retainer bridge and being disposed for adhesive contact with said object to retain said staple construction in assembly with said object.

10. The staple construction of claim 1, wherein said means for retaining said staple construction in assembly with said object comprises:
(a) a flexible polymer element defining opposed flexible retainer members, said spaced penetrating legs penetrating said flexible polymer element, said opposed flexible retainer members being yieldable by said object as said staple construction is assembled thereto; and
(b) a quantity of adhesive material being present on said flexible polymer strip element and being disposed for adhesive contact with said object to retain said staple construction in assembly with said object.

11. The staple construction of claim 10, wherein:
(a) said flexible polymer element is of strip-like form and defines reverse bent end portions having free extremities defining said opposed flexible retainer members; and
(b) said spaced penetrating legs of said staple construction penetrating said reverse bent end portions of said flexible polymer element and securing said flexible polymer element in assembly with said spaced legs of said staple construction.

12. A staple construction for securing an object to a structure and being capable of assembly to said object to thus permit ease of manual orientation of said staple and said object relative to said structure at the time of securing said object to said structure, said staple construction comprising:
(a) a pair of spaced metal staple legs each having a pointed extremity for retaining penetration of said structure;
(b) a metal retainer bridge member being integral with said spaced staple legs and having said spaced staple legs extending from respective extremities thereof and cooperating with said spaced staple legs to define a generally U-shaped metal staple structure, said spaced staple lets having pointed ends for penetration into said structure; and
(c) at least one staple retainer member for retaining said staple construction in assembly with said object prior to forcible retaining penetration of said spaced staple legs into said structure, said at least one staple retainer member being disposed in assembly with said spaced staple legs and having a plurality of ridges and valleys extending along at least a portion of the length of said spaced staple legs, said at least one staple retainer member defining opposed yieldable retainer projections defining a space therebetween of less dimension than the dimension of said object and normally defining object retaining positions, said yieldable retainer projections being sufficiently spaced from said retainer bridge to permit movement of said yieldable retainer projections completely past said object upon assembly of said staple construction to said object and returning to said object retaining positions upon movement thereof past said object thus retaining said staple construction in assembly with said object.

13. The staple construction of claim 12, wherein:
upon penetration of said spaced staple legs into said structure said yieldable retainer being deformable between said structure and said object and captivating at least a portion of said object.

14. The staple construction of claim 12, wherein:
(a) said staple retainer member is composed of electrically insulative polymer strip material having an elongate substantially straight intermediate portion and accordion-like folded end portions defining said ridges and valleys; and (b) said spaced penetrating legs of said staple construction penetrating and stabilizing respective accordion-like folded end portions; and (c) said ridges being defined by said accordion-like folded end portions being yieldable by said object as said staple construction is assembled about said object.

15. The staple construction of claim 12, wherein said staple retainer member further comprises:

a quantity of adhesive material being present on said retainer bridge element and being disposed for adhesive contact with said object to retain said staple construction in assembly with said object.

16. The staple construction of claim 12, wherein said means for retaining said staple construction in assembly with said object comprises:

(a) a flexible polymer element defining opposed flexible retainer members, said spaced penetrating legs penetrating said flexible polymer element, said opposed flexible retainer members being yieldable by said object as said staple construction is assembled thereto; and (b) a quantity of adhesive material being present on said flexible polymer strip element and being disposed for adhesive contact with said object to retain said staple construction in assembly with said object.

17. The staple construction of claim 16, wherein:

(a) said flexible polymer element is of strip-like form and defines reverse bent end portions having free extremities defining said opposed flexible retainer members; and (b) said spaced penetrating legs of said staple construction penetrating said reverse bent end portions of said flexible polymer element and securing said flexible polymer element in assembly with said spaced legs of said staple construction.

* * * * *